2,906,671

**PROCESS OF PRODUCING GIBBERELLIC ACID BY CULTIVATION OF *GIBBERELLA FUJIKUROI***

Antony Borrow, Edward Garstang Jefferys, and Ian Stewart Nixon, Welwyn, England, assignors to Imperial Chemical Industries Limited, London, England, a corporation of Great Britain No Drawing. Application January 31, 1958
Serial No. 712,338

Claims priority, application Great Britain February 13, 1957

10 Claims. (Cl. 195—36)

This invention relates to improved metabolic processes, in particular to metabolic processes used for the production of gibberellic acid.

Gibberellic acid is a plant growth stimulant obtainable from the culture filtrates of certain active strains of the mould *Gibberella fujikuroi* (*Fusarium moniliforme*). It is known to manufacture gibberellic acid by cultivating an active strain of *Gibberella fujikuroi* in a suitable stirred and aerated nutrient medium containing a source of carbon for example glucose, a source of nitrogen for example ammonium nitrate, certain metallic salts for example magnesium sulphate and potassium dihydrogen phosphate and traces of metals such as iron, copper, zinc, manganese and molybdenum. It is a characteristic of this metabolic process that the acid is produced for the most part when net protein synthesis or active growth of the mould has been checked. This check in active growth may be the result of exhaustion of one of the essential constituents of the nutrient solution, e.g. nitrogen or carbon.

When active growth of the mould is checked by exhaustion of an essential constituent of the medium it is preferred that this essential constituent is not the carbon source; indeed it is preferred that carbon remains available to satisfy the requirements of the mould during the gibberellic acid production stage. Within limits the more carbon there is available during the acid production stage the higher is likely to be the gibberellic acid production. However, a high concentration of carbon, particularly when in the form of sugar, in the initial stage of the metabolic process is likely to retard the rate of growth of the mould and consequently have an adverse effect on the overall efficiency of the process.

According to the present invention in a metabolic process for the production of gibberellic acid by cultivating an active strain of *Gibberella fujikuroi* and checking active growth to promote gibberellic acid production, carbon availability is maintained during the gibberellic acid production stage by adding a source of carbon to the medium.

The source of carbon may be added continuously or batchwise at intervals and a suitable source of carbon may be a sugar for example sucrose or glucose, a polyhydric alcohol for example glycerol or esters thereof, or a vegetable oil.

The source of nitrogen used in the medium may be an ammonium salt, a nitrate, corn steep liquor or a digest of protein such as peptone or other sources containing assimilable nitrogen.

By means of the invention we have found it possible to initiate a high active growth of the mould and yet satisfy its carbon requirements during the gibberellic acid production stage.

The invention is illustrated by the following. Two fermenters, A and B, were set up, each with 30 litres of a medium containing:

|  | Fermenter A | Fermenter A |
|---|---|---|
| Glucose monohydrate_____percent w./v__ | 10 | 10 |
| Ammonium nitrate_____do____ | 0.48 | 0.24 |
| Potassium dihydrogen phosphate_____do____ | 0.5 | 0.5 |
| Magnesium sulphate heptahydrate_____do____ | 0.1 | 0.1 |
| Minor element concentrate [1]____percent v./v__ | 0.2 | 0.2 |

[1] The composition of the minor element concentrate is as follows:

Ferrous sulphate heptahydrate_____gm__ 0.1
Copper sulphate pentahydrate_____gm__ 0.015
Zinc sulphate heptahydrate_____gm__ 0.1
Manganese sulphate heptahydrate_____gm__ 0.01
Potassium molybdate ($K_2MoO_4$)_____ml__ 0.01
Water _____ml__ 100

The media were inoculated with an active strain of *Gibberella fujikuroi* (samples deposited in the culture collections of the Commonwealth Mycological Institute, Kew, the Bureau voor Schimmelcultures, Baarn, and the Northern Utilisation Research and Development Division of the United States Department of Agriculture, Peoria, Illinois, U.S.A.), and were maintained at a temperature of 26.2° C., air being blown into the media at a rate of 15 litres/minute. After fermentation had proceeded for 118 hours, by which time active growth had been substantially checked by exhaustion of nitrogen in the media, glucose monohydrate was added aseptically in lots of 150 grams to maintain the sugar concentration in the media above 2% w./v.

The following table shows the total sugar used by the mould and the gibberellic acid concentration in the two media as cultivation proceeded.

| Time (hours after inoculation) | Gibberellic acid, mg./l. | | Sugar used, g./l. | |
|---|---|---|---|---|
| | Fermenter A | Fermenter B | Fermenter A | Fermenter B |
| 48_____ | _____ | _____ | 5 | 5 |
| 69_____ | _____ | _____ | 11 | 12 |
| 76_____ | _____ | _____ | 15 | 16 |
| 93_____ | _____ | _____ | 44 | 25 |
| 99_____ | _____ | _____ | 57 | 29 |
| 117_____ | _____ | _____ | 98 | 52 |
| 119_____ | _____ | _____ | 98 | 56 |
| 124_____ | _____ | _____ | 106 | 56 |
| 141_____ | _____ | Nil | 129 | 68 |
| 148_____ | _____ | _____ | 135 | 69 |
| 166_____ | _____ | 48 | 153 | 78 |
| 171_____ | Nil | _____ | 157 | 79 |
| 189_____ | Trace | 86 | 172 | 87 |
| 215_____ | Trace | 115 | 193 | 95 |
| 238_____ | 63 | 147 | 209 | 109 |
| 285_____ | 87 | 178 | 219 | _____ |
| 334_____ | 135 | 252 | 246 | 109 |
| 405_____ | 192 | 297 | 278 | _____ |
| 501_____ | 251 | 375 | 265 | 167 |
| 573_____ | 324 | 409 | 355 | 237 |

The medium used in fermenter A was substantially balanced with respect to carbon and nitrogen, i.e. it contained these two nutrients in the approximate proportions in which they are taken up by the actively growing mould. Consequently the carbon would be exhausted at about the same time as the nitrogen and in the absence of additions of nutrients the gibberellic acid subsequently produced could not have been expected to exceed 120 mg./litre. The table shows however that when additions of a source of carbon, in this case glucose monohydrate, are made after cessation of active growth, gibberellic acid production can be maintained at least until the concentration rises to 324 mg./litre.

In the case of fermenter B the medium initially contained excess carbon which was still available when the nitrogen content had been exhausted and normal gibberellic acid production would have been expected to be as much as 240 mg./litre. However, additions of sugar to maintain carbon availability resulted in the acid concentration rising to 409 mg./litre.

The medium used for the active growth stage of the mould is a so-called balanced medium wherein the concentration of nitrogen may be within the range of 0.017–0.26% w./v. for example in the form of 0.05–0.75% w./v. of ammonium nitrate and preferably within the range of 0.07–0.17% w./v. of nitrogen for example in the form of 0.2–0.5% w./v. of ammonium nitrate. The concentration of carbon for example in the form of sucrose, glucose or glycerol is then chosen to provide a medium wherein the ratio of carbon to nitrogen preferably lies between the values of 10:1 and 25:1. A typical balanced medium suitable for active growth may contain for example 0.24% w./v. of ammonium nitrate and 3.18% w./v. of glucose monohydrate, i.e. a ratio of C:N of 14:1 or it may contain 0.48% w./v. of ammonium nitrate and 10% w./v. of glucose monohydrate, i.e. a ratio of C:N of 21:5.

When active growth is substantially checked by exhaustion of nitrogen in a balanced medium, there is little or no excess carbon remaining in the medium and there is thus little or no carbon from which the mould can produce gibberellic acid. This is the stage at which an additional source of carbon is added to the medium in order to sustain the production of gibberellic acid.

The amount of carbon source added to the medium at the end of the active growth stage is controlled in order to prevent inhibition of the mould in its production of gibberellic acid. A large excess of carbon source is disadvantageous in the acid production stage and a reasonable excess may be for example in the form of between 0.1 and 10% w./v. of glucose and more particularly in the form of between 1 and 4% w./v. of glucose.

The process with which this invention is concerned may be used in conjunction with a multistage process for the production of gibberellic acid as described in our co-pending application No. 712,337. Thus the cultivation of the active strain of Gibberella fujikuroi may be carried out in two or more stages, preferably at least three stages, the first stage being one of active growth of the mould in an approximately balanced medium, i.e. the ratio of C:N in the medium is between 10:1 and 25:1, the second stage being one in which active growth proceeds, in a medium containing a high ratio of C:N for example between about 30:1 and about 55:1 and active growth is checked by exhaustion of nitrogen leaving an excess of the carbon source and the third stage being one in which additional quantities of the carbon source are fed into the medium keeping an approximately constant concentration of carbon source in the medium until the production of gibberellic acid ceases.

Thus for example, the first stage may be carried out in a medium containing 3.18% w./v. of glucose monohydrate and 0.24% w./v. of ammonium nitrate i.e. a C:N ratio of about 14:1 and the second stage may then be carried out in an unbalanced medium of higher C:N ratio for example a medium containing 16% w./v. or 10% w./v. of glucose monohydrate and 0.4% w./v. of ammonium nitrate, i.e. a ratio of C:N of 41:1 or 26:1 respectively. The growth of the mould continues until the source of nitrogen is completely used up and there then remains an excess of the source of carbon and the production of gibberellic acid begins. During this production of gibberellic acid, the excess of carbon source is steadily used up and when the said source reaches a concentration of about 0.5–10% w./v. of the medium, the addition of further quantities of a carbon source, which may or may not be the same as that used in the earlier stages, begins in order to maintain a constant concentration of carbon in the medium and thereby sustain continued production of gibberellic acid in yields which have not hitherto been attained.

The preferred source of carbon is a sugar for example sucrose or glucose and the preferred constant concentration of the said sugar during the continued production of gibberellic acid is in the range of about 1% to about 4% w./v. of the medium. The preferred constant concentration can be attained by adding quantities of sugar to the medium in the final gibberellic acid production stage at intervals for example at 12–24 hourly intervals. By this means there can be obtained a culture medium containing up to about 1000 mg. of gibberellic acid per litre of medium and the said acid can be isolated from the medium by known means.

The invention is further illustrated by the following examples:

EXAMPLE 1

*Preparation of inoculum*

5 litres of a nutrient medium containing glucose monohydrate 8% (w./v.), ammonium nitrate 0.4% (w./v.), potassium dihydrogen phosphate 0.5% (w./v.), magnesium sulphate heptahydrate 0.1% (w./v.) and a minor element concentrate 0.2% (v./v.), composition described earlier, at pH 3.47 is inoculated from an agar culture of *Gibberella fujikuroi*. The medium is maintained at 25° C. and is stirred and aerated with air at the rate of 2.5 litres of air per minute.

PRODUCTION FERMENTATION

After 80 hours, 5 litres of the above culture are inoculated into a 100-litre fermenter vessel containing a nutrient medium prepared as follows:

| | |
|---|---|
| Glucose monohydrate | 8% w./v. |
| Ammonium nitrate | 0.24% w./v. |
| Magnesium sulphate heptahydrate | 0.1% w./v. |
| Potassium dihydrogen phosphate | 0.5% w./v. |
| Minor element concentrate [1] | 0.2% v./v. |
| Water to make up to 75 litres. | |

[1] The composition of the minor element concentrate is that given above.

The medium is sterilised and then cooled and inoculated with 5 litres of the inoculum as described above. The medium is stirred and maintained at a temperature of 26° C. and is aerated with an air flow of 0.5 volume of air per volume of culture medium per minute. When active growth of the mould has ceased, i.e. when the nitrogen source is completely used up, production of gibberellic acid begins, and the remaining source of carbon (glucose) rapidly diminishes in concentration. After 39 hours from the beginning of the formation of gibberellic acid in the acid production stage, the glucose concentration is about 0.9% w./v. and thus additional quantities of sugar are added to the nutrient medium at 12-hourly intervals, in order to maintain a concentration of approximately 2% w./v. of glucose in the nutrient medium throughout the remainder of the acid production stage of the fermentation. The following table shows the concentration of gibberellic acid in the medium in relation to the glucose consumed as fermentation proceeds:

| Age (hours after inoculation) | Gibberellic acid (mg./litre) | Sugar used (percent w./v.) |
|---|---|---|
| 48 | 23 | 4.9 |
| 71 | 105 | 6.8 |
| 144 | 268 | 10.6 |
| 191 | 352 | 12.1 |
| 336 | 489 | 16.5 |
| 359 | 618 | 17.1 |

The fermenter contents are then filtered and a sample (58 litres) of the filtrate is extracted with ethyl acetate to remove gibberellic acid which is then recovered by known means. There is thus obtained 33.48 gm. of gibberellic acid has a colourless crystalline powder, M.P. 233–235° C. with decomposition. A second crop of gibberellic acid can be obtained from the crystalline filtrate.

*Example 2*

The process described in Example 1 is repeated except that the 8% w./v. of glucose monohydrate and 0.24% w./v. of ammonium nitrate in the nutrient medium used for the gibberellic acid production stage of the fermentation are replaced by 20% w./v. of glucose monohydrate and 0.4% w./v. of ammonium nitrate. During the gibberellic acid production stage, the excess glucose present in the nutrient medium is rapidly used up and additional quantities of glucose monohydrate are added at 12-hourly intervals, after about 74 hours, in order to maintain a concentration of approximately 4% w./v. of glucose in the nutrient medium throughout the remainder of the gibberellic acid production stage of the fermentation. The following table shows the concentration of gibberellic acid in the medium in relation to the glucose consumed as fermentation proceeds:

| Age (hours after inoculation) | Gibberellic acid (mg./litre) | Sugar used (percent w./v.) |
|---|---|---|
| 76 | 6 | 6.5 |
| 100 | 46 | 10.4 |
| 112 | 79 | 12.3 |
| 124 | 133 | 13.4 |
| 136 | 138 | 14.6 |
| 148 | 229 | 16.3 |
| 160 | 245 | 17.9 |
| 172 | 291 | 18.5 |
| 184 | 306 | 19.1 |
| 232 | 350 | 21.6 |
| 244 | 428 | 22.3 |
| 268 | 453 | 23.9 |
| 280 | 487 | 24.7 |
| 292 | 520 | 25.4 |
| 304 | 541 | 26.2 |
| 316 | 559 | 27.1 |
| 329 | 610 | 27.7 |
| 341 | 624 | 28.7 |
| 364 | 646 | 30.2 |
| 376 | 640 | 30.8 |
| 412 | 670 | 33.1 |
| 460 | 768 | 34.2 |
| 484 | 794 | 34.4 |
| 508 | 826 | 35.0 |

*Example 3*

The process described in Example 1 is repeated except that the 8% w./v. of glucose monohydrate and 0.24% w./v. of ammonium nitrate in the nutrient medium used for the production fermentation are replaced by 20% w./v. of glucose monohydrate and 0.4% w./v. of ammonium nitrate. During the gibberellic acid production stage the excess glucose present in the nutrient medium is rapidly used up and additional quantities of glucose monohydrate are added at 12-hourly intervals, after about 26 hours, in order to maintain a concentration of approximately 10% w./v. of glucose in the nutrient medium throughout the remainder of the gibberellic acid production stage of the fermentation. The following table shows the concentration of gibberellic acid in the medium in relation to the glucose consumed as fermentation proceeds:

| Age (hours after inoculation) | Gibberellic acid (mg. litre) | Sugar used (percent w./v.) |
|---|---|---|
| 28 | 10 | 6.4 |
| 30 | 22 | 8.1 |
| 52 | 67 | 9.4 |
| 64 | 100 | 11.2 |
| 76 | 115 | 12.1 |
| 88 | 121 | 13.7 |
| 100 | 160 | 14.2 |
| 112 | 192 | 14.8 |
| 124 | 203 | 15.7 |
| 136 | 249 | 16.8 |
| 148 | 261 | 17.6 |
| 184 | 272 | 19.0 |
| 208 | 285 | 20.3 |
| 220 | 350 | 21.0 |
| 244 | 383 | 22.6 |
| 256 | 445 | 23.2 |
| 268 | 520 | 24.0 |
| 293 | 541 | 25.6 |
| 304 | 546 | 26.5 |
| 328 | 583 | 28.3 |
| 412 | 754 | 32.7 |
| 460 | 794 | 33.7 |
| 508 | 820 | 34.4 |
| 532 | 840 | 34.6 |
| 580 | 905 | 35.0 |

*Example 4*

The process described in Example 1 is repeated except that the 8% w./v. of glucose monohydrate and 0.24% w./v. of ammonium nitrate are replaced by 16.0% w./v. of glucose monohydrate and 0.4% w./v. of ammonium nitrate. During the gibberellic acid production stage of the fermentation, the excess glucose present in the nutrient medium is used up and additional quantities of glucose monohydrate are added after 162 hours and thereafter at 12–24 hourly intervals, in order to maintain a concentration of approximately 1–3% w./v. of glucose in the nutrient medium throughout the remainder of the acid production stage of the fermentation. The following table shows the concentration of gibberellic acid in the medium in relation to the glucose concentration as fermentation proceeds:

| Age (hours after inoculation) | Gibberellic acid (mg./litre) | Concentration of sugar (percent w./v.) |
|---|---|---|
| 16 | | 15.95 |
| 40 | | 15.5 |
| 46 | | 14.16 |
| 52 | | 14.05 |
| 64 | | 12.36 |
| 69 | | 10.99 |
| 75 | 10 | 9.35 |
| 88 | 42 | 7.83 |
| 93 | 60 | 8.70 |
| 100 | 88 | 5.94 |
| 111 | 107 | 4.77 |
| 124 | | 3.51 |
| 136 | 198 | 2.59 |
| 148 | 206 | 1.63 |
| 160 | 253 | 0.75 |
| 172 | 306 | 0.93 |
| 184 | 311 | 0.94 |
| 208 | 449 | 1.53 |
| 232 | 449 | 3.2 |
| 256 | 478 | 2.13 |
| 280 | 507 | 1.78 |
| 304 | 558 | 1.72 |
| 328 | 642 | 1.72 |
| 352 | 692 | 3.17 |
| 376 | 765 | 3.31 |
| 400 | 809 | 3.3 |
| 424 | | 2.35 |
| 448 | 838 | 2.43 |
| 472 | 864 | 1.43 |
| 496 | 864 | 1.5 |
| 520 | 956 | 1.41 |

The gibberellic acid is isolated by known means by filtration of the fermentation medium and passage of the filtrate (63 litres) through carbon. The adsorbed gibberellic acid is removed by elution and recovered and purified by crystallization. There is thus obtained 63.0 gm. of gibberellic acid as a colourless crystalline product, M.P. 233-235° C. with decomposition.

*Example 5*

The process described in Example 1 is repeated except that the 8% w./v. of glucose monohydrate and 0.24% w./v. of ammonium nitrate are replaced by 20% w./v. of glucose monohydrate and 0.4% w./v. of ammonium nitrate. During the gibberellic acid production stage of the fermentation, the excess glucose present in the nutrient medium is used up and additional quantities of glucose monohydrate are added after 154 hours and thereafter at 12 hourly intervals, in order to maintain a concentration of approximately 1-4% w./v. of glucose in the nutrient medium throughout the remainder of the acid production stage of the fermentation. The following table shows the concentration of gibberellic acid in the medium in relation to the glucose concentration as fermentation proceeds:

| Age (hours after inoculation) | Gibberellic acid (mg./litre) | Concentration of sugar (per cent w./v.) |
| --- | --- | --- |
| 9 | | 18.25 |
| 40 | | 17.97 |
| 44 | | 16.98 |
| 57 | | 16.2 |
| 63 | | 15.43 |
| 82 | 6 | 12.69 |
| 106 | 46 | 8.73 |
| 118 | 79 | 6.86 |
| 130 | 133 | 5.76 |
| 142 | 138 | 4.6 |
| 154 | 229 | 3.84 |
| 166 | 245 | 4.23 |
| 178 | 291 | 4.07 |
| 190 | 305 | 4.09 |
| 202 | | 4.06 |
| 214 | | 4.14 |
| 226 | | 4.09 |
| 238 | 350 | 3.82 |
| 250 | 427 | 3.86 |
| 262 | 427 | 3.68 |
| 274 | 452 | 3.4 |
| 286 | 486 | 3.31 |
| 298 | 519 | 3.13 |
| 310 | 558 | 3.05 |
| 322 | 591 | 2.79 |
| 335 | 634 | 2.46 |
| 347 | 623 | 2.54 |
| 358 | 623 | 2.07 |
| 370 | 645 | 1.88 |
| 382 | 639 | 3.3 |
| 394 | 660 | 1.5 |
| 406 | 669 | 1.35 |
| 418 | 669 | 0.21 |
| 430 | 669 | 1.12 |
| 442 | 669 | 0.84 |
| 466 | 940 | 0.8 |
| 490 | 792 | 0.13 |
| 514 | 825 | |
| 538 | | |
| 562 | 809 | |
| 586 | 812 | |

*Example 6*

The process described in Example 1 is repeated except that the 8% w./v. of glucose monohydrate and 0.24% w./v. of ammonium nitrate are replaced by 10% w./v. of glucose monohydrate and 0.4% w./v. of ammonium nitrate. During the gibberellic acid production stage of the fermentation, the excess glucose present in the nutrient medium is used up and additional quantities of glucose monohydrate are added after 60.5 hours and thereafter at 12-24 hourly intervals, in order to maintain a concentration of approximately 2-4% w./v. of glucose in the nutrient medium throughout the remainder of the acid production stage of the fermentation. The following table shows the concentration of gibberellic acid in the medium in relation to the glucose concentration as fermentation proceeds:

| Age (hours after inoculation) | Gibberellic acid (mg./litre) | Concentration of sugar (per cent w./v.) |
| --- | --- | --- |
| 16 | | 10.58 |
| 40 | | 8.39 |
| 46 | | 6.9 |
| 52 | 5 | 5.44 |
| 60 | 14 | 3.58 |
| 64 | 29 | 4.87 |
| 69 | 65 | 3.67 |
| 75 | 93 | 2.86 |
| 88 | 128 | 3.69 |
| 93 | 154 | 2.83 |
| 100 | 174 | 2.49 |
| 111 | 195 | 2.54 |
| 124 | 225 | 2.54 |
| 136 | 276 | 2.54 |
| 148 | 293 | 2.76 |
| 160 | 323 | 2.95 |
| 184 | 406 | 3.18 |
| 208 | 491 | 3.77 |
| 232 | 500 | 4.52 |
| 256 | 569 | 4.6 |
| 280 | 590 | 4.04 |
| 304 | | 3.96 |
| 328 | 698 | 2.79 |
| 352 | 762 | 2.84 |
| 376 | 825 | 2.41 |
| 400 | 901 | 2.16 |
| 424 | | 0.84 |
| 448 | 973 | 0.33 |
| 472 | 1,002 | 0.22 |
| 496 | 989 | 0.26 |
| 520 | | 0.21 |

The gibberellic acid is isolated by known means by filtration of the fermentation medium and passage of the filtrate (60 litres) through carbon. The adsorbed gibberellic acid is removed by elution and recovered and purified by crystallisation. There is thus obtained 63.6 gm. of gibberellic acid as a colourless crystalline solid, M.P. 233-235° C. with decomposition.

What we claim is:

1. A metabolic process for the production of gibberellic acid by cultivating an active strain of *Gibberella fujikuroi* and checking active growth to thereby promote gibberellic acid production, wherein carbon availability is maintained during the gibberellic acid production stage by adding a source of carbon to the medium.

2. Process as claimed in claim 1 wherein the source of carbon is selected from the group consisting of sucrose, glucose, glycerol, glycerol esters and vegetable oil.

3. Process as claimed in claim 1 wherein the said medium includes a source of nitrogen selected from the group consisting of an ammonium salt, a nitrate, corn steep liquor and peptone.

4. Process as claimed in claim 1 wherein the active growth stage is carried out in a balanced medium having concentration of nitrogen within the range of 0.017-0.26% w./v.

5. Process as claimed in claim 4 wherein the nitrogen is in the form of ammonium nitrate of a concentration of 0.05-0.75% w./v.

6. Process as claimed in claim 4 wherein the ratio of carbon to nitrogen is within the range of 10:1 and 25:1.

7. Process as claimed in claim 6 wherein the carbon is in the form of 10% w./v. of glucose monohydrate and the nitrogen is in the form of 0.48% w./v. respectively of ammonium nitrate.

8. Process as claimed in claim 1 wherein the concentration of carbon in the medium during the acid production stage is in the form of between 0.1% and 10% w./v. of glucose.

9. Process as claimed in claim 1 which is carried out in at least two stages, the first stage being one of active growth in a balanced medium wherein the ratio of carbon to nitrogen is between 10:1 and 25:1, the second stage being one of active growth in an unbalanced medium wherein the ratio of carbon to nitrogen is between about 30:1 and about 55:1 until checked by exhaustion of nitrogen and any subsequent stage being one in which additional quantities of the carbon source are added to the medium in order to maintain an approximately constant concentration of carbon source.

10. Process as claimed in claim 9 wherein the approximately constant concentration of carbon source is between 0.5% and 10% w./v. of the medium.

References Cited in the file of this patent

UNITED STATES PATENTS

| | | |
|---|---|---|
| 1,849,053 | Bernhauer et al. | Mar. 15, 1932 |
| 1,867,946 | Hutchinson | July 19, 1932 |
| 2,394,031 | Waksman et al. | Feb. 5, 1946 |
| 2,842,051 | Brian et al. | July 8, 1958 |
| 2,865,812 | Borrow et al. | Dec. 23, 1958 |

OTHER REFERENCES

Yabuta: Chemical Abstracts, 34, 1940, 3314.
Yabuta: Chemical Abstracts, 44, 1950, 10814.
Gross et al.: Chemistry aand Industry, Aug. 23, 1954, p. 1066.
Gross et al.: Jour. Chem. Soc., December 1954, pp. 4670–4676.
Stodola et al.: Arch. of Biochemistry, 54, January 1955, pp. 240–245.